United States Patent [19]

Jabsen

[11] 4,175,004
[45] Nov. 20, 1979

[54] FUEL ASSEMBLY GUIDE TUBE

[75] Inventor: Felix S. Jabsen, Lynchburg, Va.

[73] Assignee: The Babcock & Wilcox Company, New York, N.Y.

[21] Appl. No.: 828,383

[22] Filed: Aug. 29, 1977

[51] Int. Cl.² .................................................. G21C 3/30
[52] U.S. Cl. ........................................ 176/76; 176/78
[58] Field of Search .................................. 176/76, 78

[56] References Cited

U.S. PATENT DOCUMENTS

| 3,049,485 | 8/1962 | Tatlock et al. | 176/76 X |
| 3,600,277 | 8/1971 | Germer | 176/78 X |
| 3,660,233 | 5/1972 | Dalke et al. | 176/78 X |
| 3,791,466 | 2/1974 | Patterson et al. | 176/76 X |
| 3,802,995 | 4/1974 | Fritz et al. | 176/78 X |
| 3,920,516 | 11/1975 | Kmonk et al. | 176/78 |
| 3,971,575 | 7/1976 | Lesham et al. | 176/78 X |
| 4,035,233 | 7/1977 | Williamson et al. | 176/78 X |

Primary Examiner—Peter A. Nelson
Attorney, Agent, or Firm—Joseph M. Maguire; Angelo Notaro

[57] ABSTRACT

This invention is directed toward a nuclear fuel assembly guide tube arrangement which restrains spacer grid movement due to coolant flow and which offers secondary means for supporting a fuel assembly during handling and transfer operations.

11 Claims, 8 Drawing Figures

FUEL ASSEMBLY GUIDE TUBE

BACKGROUND OF THE INVENTION

This invention relates to fuel assemblies for nuclear reactors and, more particularly, to a guide tube arrangement which restrains spacer grid movement and which offers secondary alternative means for supporting a fuel assembly during handling operations.

In water cooled heterogenous nuclear reactors, the reactor core in which the fission chain is sustained generally contains an array of fuel assemblies which are identical in mechanical construction and mechanically interchangeable in any core location. The fuel assemblies are designed to maintain structural adequacy and reliability during core operation, handling, and shipping. Fuel assembly design for core operation typically considers the combined effects of flow induced vibration, temperature gradients, and seismic disturbances under both steady state and transient conditions.

Each fuel assembly contains thin elongated fuel elements, a number of spacer grids, guide tubes, an instrumentation tube, and end fittings. The fuel elements, typically known as fuel rods or pins, house the nuclear fuel. The ends of the fuel elements are sealed with end caps. The fuel elements, guide tubes and instrument tube are supported in a square array at intervals along their lengths by spacer grids which maintain the lateral spacing between these components. The guide tubes are rigidly attached at their extremities to the end fittings. Use of similar material in the guide tubes and fuel elements results in minimum differential thermal expansion. The spacer grids are constructed from rectangular strips or plates which are slotted and fitted together in an "egg crate" fashion. The walls of the square cells, formed by the interlaced strips, contain integrally punched projections which provide lateral support for the fuel elements. Spacer grid to fuel assembly component contact loads are established to minimize fretting, but to allow axial relative motion resulting from fuel element irradiation growth and differential thermal expansion.

Depending upon the position of the assembly within the reactor core, the guide tubes are used to provide continuous sheath guidance for control rods, axial power shaping rods, burnable poison rods, or orifice rods. Clearance is provided within the guide tubes to permit coolant flow therethrough to limit the operating temperature of the absorber materials. In addition, this clearance is designed to permit rod motion within the guide tubes as required during reactor operation under all conditions including seismic disturbances. Joined to each end of the guide tubes are flanged and threaded sleeves which secure the guide tubes to each end fitting by lock welded nuts.

Each fuel assembly is typically installed vertically, in a reactor pressure vessel, on and supported by a core grid assembly support plate. The lower end fitting positions the fuel assembly relative to the core grid plate. The lower ends of the fuel elements rest on the grid of the lower end fitting. Penetrations in the lower end fitting are provided for attaching the lower ends of the guide tubes thereto. The upper end fitting provides means for coupling fuel assembly handling equipment and positioning the fuel assembly within the reactor core.

In operation, the fuel elements in the reactor core become depleted at different rates, those in the center usually being subjected to a higher neutron flux and thus becoming depleted before those near the outside of the core where a lower neutron flux prevails. Consequently, all of the fuel assemblies are not normally replaced at one time but rather in stages. Furthermore, at each refueling, partially depleted elements may be relocated in order to optimize core performance and extend the time between refueling outages.

Generally, spent and new fuel assemblies are transferred from and to the core, respectively, and partially spent fuel assemblies are relocated within the core, by hoists equipped with fuel assembly grapple mechanisms which mechanically engage the upper end fitting. During handling of a fuel assembly, the assembly load, which normally bears on the grid of the lower end fitting, is transferred to the guide tubes. Should a failure of all the guide tubes occur, the fuel assembly's integrity will be destroyed and it will separate into its component parts which may result in damage to the fuel elements and the development of hazardous conditions.

Reactor coolant, under operating conditions, flows relatively parallel to the longitudinal axes of the fuel elements thereby subjecting the leading lengthwise edge of the spacer grid plates to hydraulic forces. Hence, the spacer grid may be subjected to vertical movements or perturbations under steady state or transient conditions or both. In the past, in order to restrain spacer grid movement, sleeves have been attached to the spacer grids and mechanically engaged to protrusions formed on the guide tubes. Alternatively, it has been proposed to engage tab extensions formed on the spacer grid plates with clips attached to the guide tubes in order to restrain spacer grid movement. The use of sleeves, tabs and clips, however, results in the addition of material within the reactor core which is capable of parasitically absorbing neutrons, thereby decreasing reactor efficiency. Moreover, the prior art arrangement required the forming of the protrusions after the guide tube was inserted into the spacer grid complicating both assembly and disassembly procedures. Additionally, use of guide tube clips adds the additional step of welding extraneous material to the guide tube which is capable of disengaging from the tube and being carried through the reactor coolant systems.

SUMMARY OF THE INVENTION

According to the present invention, in a fuel assembly of the type described above, a guide tube arrangement is presented which restrains spacer grid movement without the introduction of additional material capable of parasitic absorption, which readily permits assembly and disassembly of the fuel assembly, and which offers a secondary means of support during fuel assembly handling operations in the event that the guide tubes become disengaged from the lower end fitting.

The foregoing is achieved by forming protuberancies, located in a preferred embodiment, at ninety degree intervals about the guide tube, longitudinally spaced such that they can be disposed adjacent either side of a spacer grid plate within the fuel assembly or centrally between saddle projections formed on the grid plates. The fuel assembly is completed by inserting the tube into a longitudinally aligned group of spacer grid cells such that the guide protuberancies project into the corners of the cell. When the guide tube has traversed the desired insertion length, it is rotated forty-five degrees thereby bringing the protuberancies into longitudinal alignment with the lengthwise edges or the saddles of the adjacent spacer grid plates that form the cells. Hence, longitudinal movements of the grid plates are restricted by the protuberancies.

During handling of the fuel assembly, the assembly load which bears on the lower end fitting is transferred to the guide tubes. Should a failure of all the guide tubes occur, the fuel elements will slip until the upper end cap which is formed with a diametrical section greater than the width of a spacer grid cell is stopped by the upper edges of the upper spacer grid assembly. The upper spacer grid assembly, in turn, will slip until it is restricted by the guide tube protuberancies.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DESCRIPTION OF THE PREFERRED EMBODIMENTS

Figure 1:
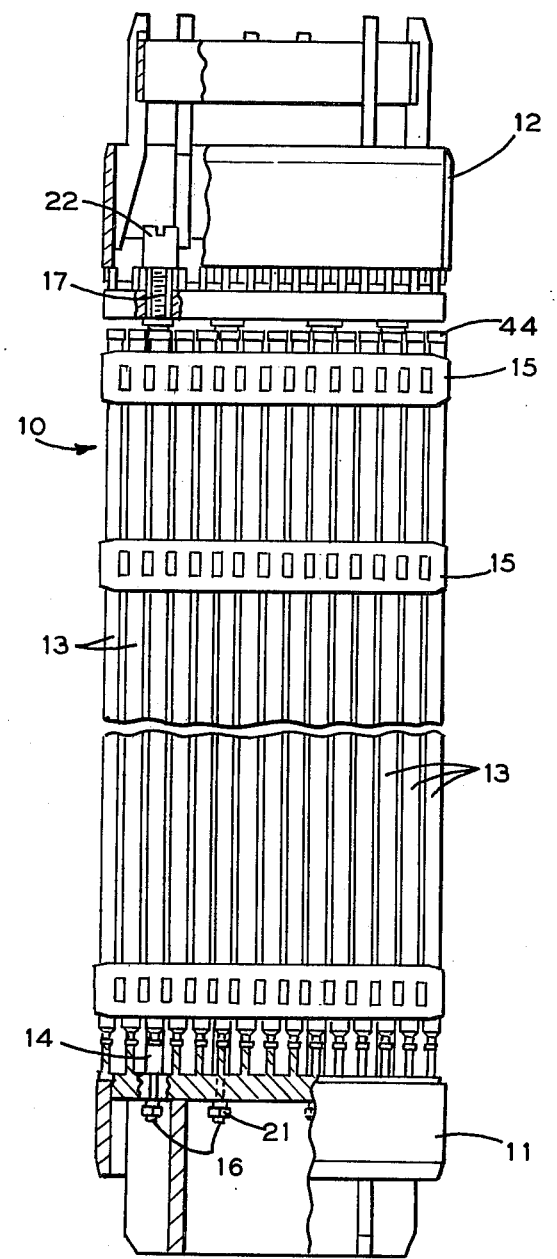
FIG. 1 is an elevation view, partly broken away and partly in section, of a fuel assembly.

FIG. 1 illustrates a fuel assembly 10, oriented with its longitudinal axis in the vertical plane, including a lower end fitting assembly 11, an upper end fitting assembly 12, a plurality of elongated fuel elements 13, hollow guide tubes 14 and spacer grid assemblies 15. The fuel elements 13 and guide tubes 14 are laterally spaced and supported in a square array parallel to each other at intervals along their length by the spacer grid assemblies 15. Threaded sleeves 16, 17 welded to each end of the guide tubes 14 respectively secure the guide tubes to the lower and upper end fitting assemblies 11, 12 by lock welded nuts 21, 22 in a manner such as is described in U.S. Pat. No. 3,828,868 by F. S. Jabsen and assigned to The Babcock & Wilcox Company.

Figure 2:
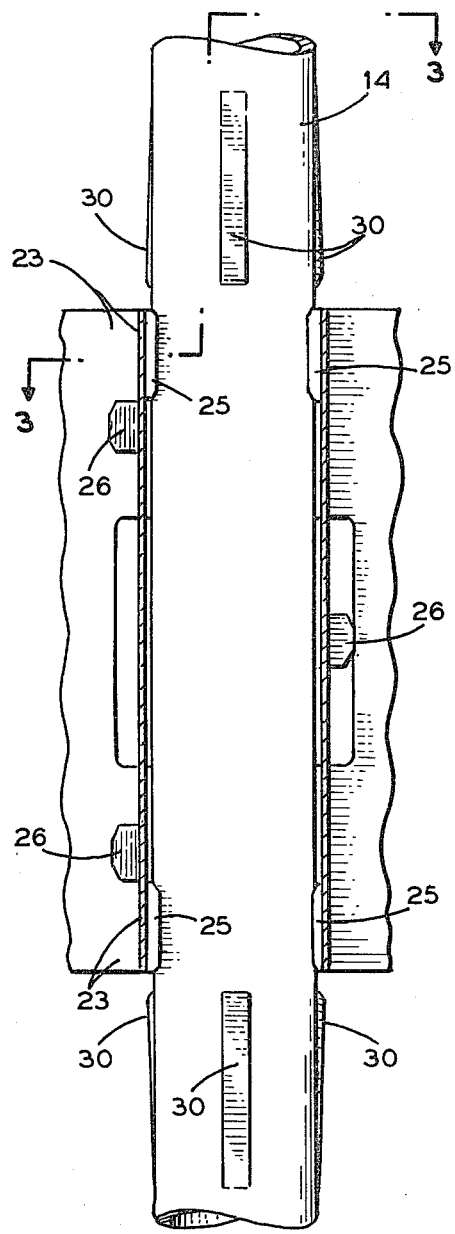
FIG. 2 is an enlarged detail view, in section, of a portion of the fuel assembly of FIG. 1 made in accordance with an embodiment of the invention.
Figure 3:
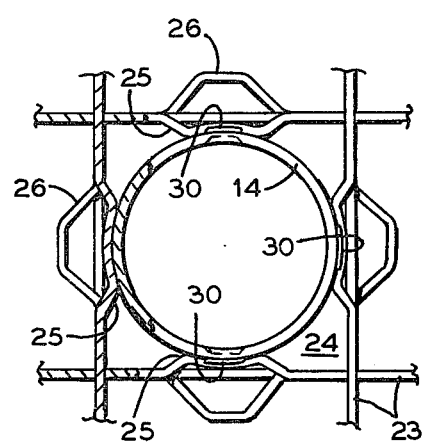
FIG. 3 is a sectional view of the arrangement of FIG. 2 taken along line 3—3.

Each one of the spacer grid assemblies 15, as is best shown in FIG. 3, is composed of a multiplicity of grid plates 23 which are slotted and fitted together in an "egg-crate" fashion to form the cells 24 through which the fuel elements 13 (shown in FIG. 1) and guide tubes 14 extend. The spacer grid plates 23 are generally of the type described in U.S. Pat. No. 3,665,586 by F. S. Jabsen and assigned to The Babcock & Wilcox Company and, as is shown in FIG. 2, have indentations 26 laterally extending into those cells 24 that contain fuel elements 13 for engagement and support of the fuel elements. The lengthwise edges of the grid plates 23 are provided with arcuate saddles 25 in the wall portions of the plates that form those cells 24 through which the guide tubes 14 extend. The guide tubes 14 generally have larger diameters than the fuel elements 13. The arcuate saddles 25 are generally shaped to conform to the cylindrical shape of the guide tubes.

As is best shown in FIG. 2, the guide tubes 14 are formed with protuberancies 30 that radially extend the diameter of the guide tubes, and which are circumferentially spaced about the perimeter of the guide tube 14. The protuberancies 30, moreover, are formed at longitudinally aligned and spaced intervals along the guide tube length. In the guide tube 14 shown in FIG. 2, longitudinally separated groups of protuberancies are spaced apart so as to span the width of a spacer grid plate 23. Some longitudinal clearance is generally maintained between the protuberancies 30 and the grid plate 23.

As is shown in FIGS. 2 and 3, each spacer grid assembly 15 (shown in FIG. 1) is restricted from longitudinal movement by the protuberancies 30 which are longitudinally aligned with the saddles 25 of the grid plates. Thus, the protuberancies 30 bear against and restrain the plates at the saddles 25 if the grid plates longitudinally shift position. The guide tube 14 shown in FIGS. 2 and 3 is formed with groups of four equidistantly circumferential or perimetrical spaced protuberancies located at intervals along the length of the guide tube.

Figure 4:
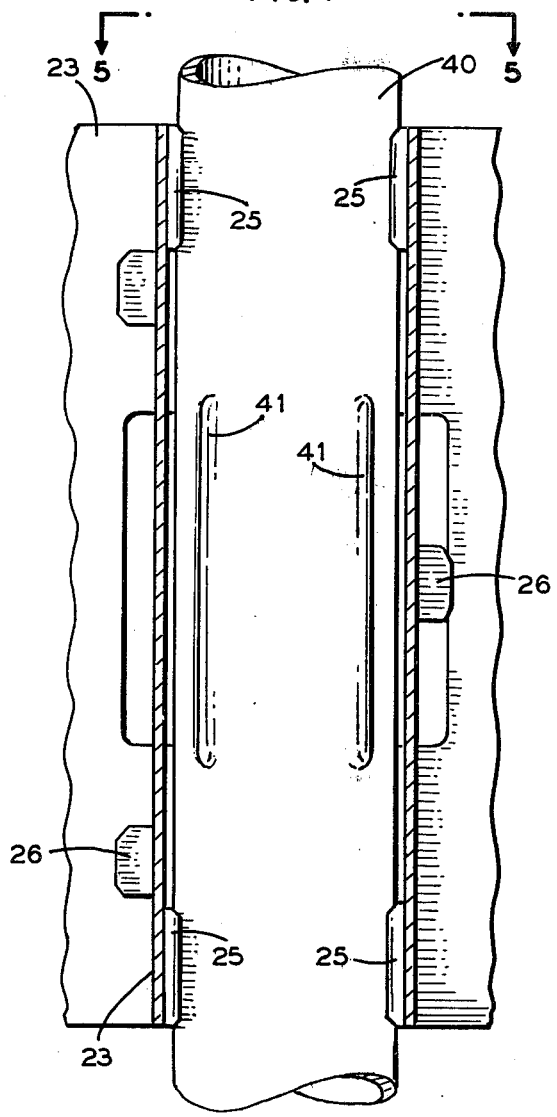
FIG. 4 is an enlarged detail view, in section, of a portion of the fuel assembly of FIG. 1 made in accordance with an alternate embodiment of the invention.
Figure 5:
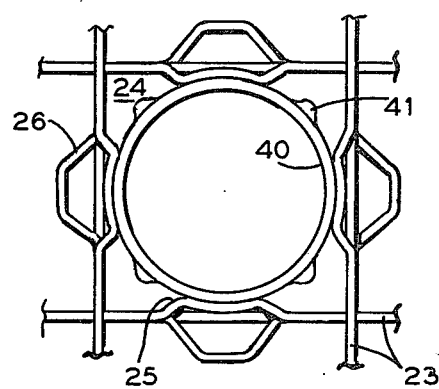
FIG. 5 is a sectional view of the arrangement of FIG. 4 taken along line 5—5.

An alternative method of forming protuberancies is shown in FIGS. 4 and 5 wherein a generally cylindrical guide tube 40 is provided with a plurality of protuberancies 41 that radially extend the diameter of the guide tube 40, and are circumferentially spaced about the guide tube. The protuberancies 41 are longitudinally aligned and spaced apart along the guide tube length. The protuberancies 41, as is shown in FIG. 4, are located between the saddles 25 that are formed in the grid plate to be restrained by the protuberancies. The protuberancies 41 are spaced at ninety degree intervals about the circumference of the cylindrical guide tube 40 as is shown in FIG. 5.

Figure 7:
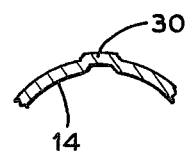
FIG. 7 is a detail view of a feature of the guide tube 40 of FIGS. 2 and 3.
Figure 8:
FIG. 8 is a detail view of a feature of the guide tubes of FIGS. 4 and 5.
Figure 6:
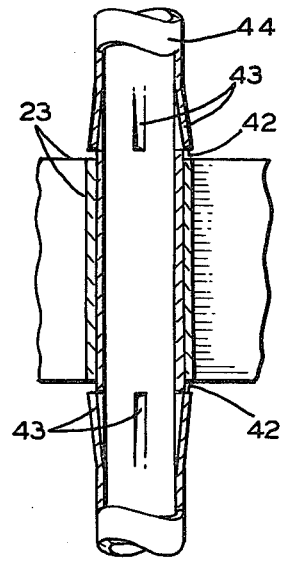
FIG. 6 is an enlarged detail view, in section, of a portion of a fuel assembly made in accordance with still another embodiment of the invention.

The guide tube protuberancies may take various shapes. FIG. 6, for example, shows the general arrangement of FIG. 2. However, cuts have been made through the protuberancy 43 edge, adjacent to the spacer grid plate 23 edges or saddles, of the guide tube 44 in order to form a lip 42 for more positively engaging the grid plate saddles 25. FIGS. 7 and 8 illustrate, in detail, the formation of the protuberancies 30 and 41 of guide tubes 14 and 40, respectively. The protuberancies, as shown, are an integral part of the guide tube walls.

A guide tube is inserted through the spacer grid assemblies by orienting the protuberancies so that each projects into a corner of the cell 23, as is illustratively shown in FIGS. 4 and 5. When the guide tube has been inserted to the desired length, it is rotated approximately forty-five degrees, to bring the guide tube protuberancies into longitudinal alignment with the spacer grid plate saddles, as is best shown in FIGS. 2 and 3. As shown in FIGS. 2 and 3, the cross-section of the guide tube 14 at each protuberancy 30 is greater than the distance between the saddles 25 of parallel grid plates forming the cell 24 through which the guide tube extends.

In this manner, a fuel assembly can be assembled without the need for rigidly attaching the guide tube to grid plate by welding or brazing; and, the fuel assembly can be disassembled without the need for cutting. Moreover, no additional components such as sleeves, clips or tabs, which introduce additional parasitic absorbing materials are required.

As explained hereinbefore, a suitable hoist and grapple mechanism is generally utilized to transfer a fuel assembly to and from the reactor core. The handling device usually engages the upper end fitting assembly for lifting and movement of the fuel assembly. During handling of the fuel assembly, the assembly load, which bears on the lower end fitting assembly, is transferred to the guide tubes. Should a failure of all the guide tubes occur, the fuel elements will begin to slip through the spacer grid assemblies 15. The upper end of each fuel element is plugged with an upper end cap 44 (FIG. 1). The upper end cap 44, moreover, has a diametrical portion exceeding the width of the cells 24. Thus, the fuel elements 13 slip until the end cap 44 engages the uppermost spacer grid assembly. The upper spacer grid, in turn, will longitudinally slip until it is restricted by the guide tube protuberancies, thereby precluding separation of the fuel assembly into its component parts.

It will be evident to those skilled in the art that changes may be made, e.g., the use of a straight edge in lieu of a saddle for engaging the protuberancies and grid plates, or the use of different multiples of protuberancies, or protuberancies having different shapes, or non-cylindrical guide tubes, without departing from the spirit of the invention covered in the claims.

I claim:

1. In combination with a nuclear fuel assembly of the type having a plurality of vertically extending fuel elements and guide tubes maintained in a laterally spaced array by at least one cellular spacer grid assembly that is composed of a multiplicity of intersecting slotted grid plates disposed to form a plurality of cells through which the fuel elements and guide tubes extend; and, lower and upper end fitting assemblies, each being rigidly attached to the respective ends of the guide tubes, the improvement comprising a plurality of protuberancies integrally formed in the guide tubes in spaced relation, each guide tube having a cross-section at each protuberancy greater than a distance between the plates forming the cell through which the guide tubes extend, the protuberancies being longitudinally aligned with and spaced relative to at least part of of the plates such that the protuberancies engage the plates to restrain longitudinal movements of the spacer grid assembly relative to the guide tubes beyond the longitudinal spacing, and the spaced relation of the protuberancies being such that the guide tubes, including the protuberancies, may be inserted through a cell.

2. The improved nuclear fuel assembly of claim 1 further comprising saddles formed in the grid plates to project into the cells containing the guide tubes, said saddles generally conforming to the shape of the guide tubes, wherein said protuberancies are longitudinally aligned with the saddles such that the protuberancies engage the saddles to restrain movements of the plates.

3. The improved fuel assembly of claim 2 wherein at least two longitudinally spaced saddles are formed to project from each grid plate forming a guide tube cell and said protuberancies are spaced between said longitudinally spaced saddles.

4. The improved fuel assembly of claim 3 wherein groups of said longitudinally spaced protuberancies are equidistantly spaced about the perimeter of the guide tubes.

5. The improved fuel assembly of claim 4 wherein said guide tubes are cylindrical and groups of four protuberancies are equidistantly spaced about the circumference of the guide tubes at longitudinally spaced intervals.

6. The improved fuel assembly of claim 5 wherein said guide tubes protuberancies are cut to form a lip at the protuberance edge adjacent to the spacer grid plate saddle.

7. The improved fuel assembly of claim 2 wherein at least two longitudinally spaced saddles are formed to project from each grid plate forming a guide tube cell and said protuberancies are spaced to span the width of the spacer grid plates having the longitudinally spaced saddles.

8. The improved fuel assembly of claim 7 wherein groups of said longitudinally spaced protuberancies are equidistantly spaced about the perimeter of the guide tubes.

9. The improved fuel assembly of claim 8 wherein said guide tubes are cylindrical and groups of four protuberancies are equidistantly spaced about the circumference of the guide tubes at longitudinally spaced intervals.

10. The improved fuel assembly of claim 9 wherein each of said guide tube protuberancies are cut to form a lip at the protuberancy edge adjacent to the spacer grid plate saddle.

11. In combination with a fuel assembly of the type having a plurality of vertically extending fuel elements and at least one guide tube maintained in a laterally spaced array by at least one cellular spacer grid assembly that is composed of a multiplicity of intersecting slotted grid plates disposed to form a plurality of cells through which the fuel elements and guide tube extend; and lower and upper end fitting assemblies, each being rigidly attached to the respective ends of the guide tube, the improvement comprising a plurality of protuberancies integrally formed in the guide tube in spaced relation, the guide tube having a cross-section at each protuberancy greater than a distance between the plates forming the cell through which the guide tube extends, the protuberancies being longitudinally aligned with and longitudinally spaced relative to at least part of the plates such that the protuberancies engage the plates to restrain longitudinal movements of the spacer grid assembly relative to the guide tube beyond the longitudinal spacing, and the spaced relation of the protuberancies being such that the guide tube, including the protuberancies, may be inserted through cell through which the guide tube extends.

* * * * *